United States Patent [19]

Winstead

[11] 4,288,400
[45] Sep. 8, 1981

[54] METHOD FOR THE CONTINUOUS FORMATION OF BIAXIALLY ORIENTED THERMOPLASTIC MATERIALS AND FORMING ARTICLES THEREFROM BY INTERMITTENT FORMING MEANS INTERFACED THEREWITH

[75] Inventor: Thomas W. Winstead, Baltimore, Md.

[73] Assignee: Maryland Cup Corporation, Owings Mills, Md.

[21] Appl. No.: 886,161

[22] Filed: Mar. 13, 1978

[51] Int. Cl.³ ............................................. B29D 7/04
[52] U.S. Cl. .......................... 264/210.1; 264/210.7; 264/290.2; 264/515; 264/551; 425/327; 425/363
[58] Field of Search ................. 264/90, 92, 89, 210 R, 264/289, 512, 515, 551, 553, 210.1, 210.7, 290.2; 425/217, 327, 328, 363, 404, 51

[56] References Cited

U.S. PATENT DOCUMENTS

| | | | |
|---|---|---|---|
| T856,042 | 11/1968 | Villier et al. | 264/210 R |
| T892,023 | 11/1971 | Filbert et al. | 264/210 R |
| 2,571,355 | 10/1951 | Gardner | 264/289 |
| 2,895,171 | 7/1959 | Walker et al. | 264/210 R |
| 2,902,718 | 9/1959 | Martelli et al. | 264/90 |
| 3,676,537 | 7/1972 | Winstead | 264/210 R |
| 4,039,609 | 8/1977 | Thiel et al. | 264/210 R |
| 4,062,918 | 12/1977 | Nakanose | 264/210 R |
| 4,093,695 | 6/1978 | Heirbaut | 264/289 |
| 4,101,625 | 7/1978 | Haley | 264/210 R |
| 4,118,454 | 10/1978 | Miki et al. | 264/291 |

FOREIGN PATENT DOCUMENTS

2538893  10/1977  Fed. Rep. of Germany ...... 425/327

Primary Examiner—Jay H. Woo
Attorney, Agent, or Firm—Birch, Stewart, Kolasch & Birch

[57] ABSTRACT

A method and apparatus for continuously extruding, biaxially orienting and intermittently forming molded products from a web of thermoplastic material and further, continuously separating the products from the web selvage, stacking and handling the products and recycling the web selvage for further extrusion. The method and apparatus use intermittent molding devices into which configuration the biaxially oriented web is interfaced by a continuous-to-intermittent interfacing structure which preserves the dimensional and orientational integrity of the web and maintains thermal stability therein. An undulating peripheral surface on a dynamic storage or accumulator drum and associated transfer rollers cooperate with intermittently advanced feed belts in timed relationship with a reciprocating forming press to effectuate the interface and product forming portions of the process. In some of the preferred embodiments the inertia at the interface between the undulating peripheral surface of the accumulator drum and the biaxial orientation apparatus is reduced to an optimal minimum.

24 Claims, 21 Drawing Figures

METHOD FOR THE CONTINUOUS FORMATION OF BIAXIALLY ORIENTED THERMOPLASTIC MATERIALS AND FORMING ARTICLES THEREFROM BY INTERMITTENT FORMING MEANS INTERFACED THEREWITH

FIELD OF THE INVENTION

This invention relates to methods and apparatus for biaxially orienting thermoplastic materials such as polystyrene and more particularly, to a continuous method and apparatus for manufacturing webs of such material and forming objects therefrom by interfacing the continuous manufacturing process with intermittent forming means.

BACKGROUND OF THE INVENTION

The specifics of the following discussion and specification refer to oriented polystyrene material, hereinafter referred to as OPS but it should be expressly understood that the process and apparatus constituting the present invention are applicable to a wide variety of thermoplastic materials, polymers or mixtures of polymers including such materials as polymers or ethylene, polypropylene, styrene, vinyl chloride, etc.

While individual materials have problems which are often peculiar to those materials and hamper commmercial exploitation of them, the polystyrene materials exhibit low-cost, high stiffness and excellent transparency when properly oriented and the proper molecular orientation further enhances the polystyrene material by removing its inherent brittleness in the absence of molecular orientation.

There are various prior art approaches to mitigating the brittleness factor in polystyrene materials, by the use of impact modifiers and the like. However, this decreases the stiffness, eliminates transparency and increases the cost significantly.

Therefore, prior art approaches to remedy the brittleness problem and increase the impact resistance of polystyrene result in certain undesirable properties which did not exist prior to the addition of such modifiers.

Accordingly, if such materials could be used in a relatively unmodified state in manufacturing sheets or strips of this material in a continuous extruding process in which continuous biaxial orientation is imparted to this material and then, without destroying the basic continuity of the process, molded articles or otherwise formed articles or produced therefrom, all of the desirable physical properties of the material could be realized. At the same time all of the desirabilities, speed and efficiencies of a substantially continuous process could be realized in the ultimate product cost.

This integrated approach which combines continuous extrusion, orientation and substantially continuous forming in rapid succession is the crux of the present invention.

Heretofore, the conventional approaches such as with foam sheet materials and non-foamed ornon-cellular sheet materials has been to first produce sheeting, store it in rolled form and terminate the initial process at that point. Then, subsequently, the sheeting is unrolled, reheated and subsequently formed into products or articles in its reheated state. As with all thermoplastic techniques, there are three basic interrelated variables involved in processing thermoplastic materials which affect both the nature of the operation and the characteristics of the final product. These variables are temperature, time and physical state, with the latter variable dealing with pressure, stress, etc.

As a general rule, temperature and time should be minimized variables because extended heat history can materially affect the properties of an end product. In the case of OPS, for example, the temperature at which the material must be oriented represents a compromise between levels which are best from a flow point of view and levels which are best from a stress (orientation) point of view. Once a stress is imposed at a given temperature, for example, a molecular orientation is achieved. However, the longer the increment of time involved between the achievement of that orientation and a subsequent operation, the more the stress (orientation) will be relaxed or lost. Accordingly, the degree of orientation of a particular material is not necessarily a sole function of the amount of heat stretching applied to that material to create the orientation since relaxation of that orientation may simultaneously be taking place.

Therefore, a high speed, integrated approach is unique and important not only from a standpoint of cost but also from the standpoint of results heretofore not otherwise attainable.

These inherent advantages of a high speed integrated approach are important in relatively thin products such as those with wall thicknesses of 0.005 to 0.010 inches and become increasingly significant with products having wall thicknesses greater than 0.010 inches. This is due to the fact that conventional systems as heretofore defined, necessarily involve not only greater time/temperature exposure during the production of sheeting from which the ultimate products are formed, but also involve the reheating and subsequent recooling of the sheet during the subsequent forming operation. Accordingly, the relief of stress occurs during reheating and subsequent recooling as well as during a possible relaxation during the production of the sheeting per se.

Theoretically, the ideal process would be to biaxially orient the thermoplastic material, form and cool it simultaneously. In conventional systems, the time factor is significant and therefore detrimental. Accordingly, the shorter the time factor the less detrimental the effect thereof on the maintenance of a stressed or oriented condition of the material.

Of the conventional methods employed for the production of articles made from material which is biaxially oriented, perhaps the most popular and widely used prior art system involves the extrusion of a sheet from a slot die onto a roll, the temperature of the said roll being controlled, and then through a series of additional rolls which first bring the sheet to an appropriate temperature level for orientation and then longitudinally stretch the sheet between two rolls running at different speeds. This longitudinal stretching or drafting orients the material in the machine direction. The material with the longitudinal orientation is then passed onto a tenter frame to orient it transversely in a manner well-known in the art. Since conventional tentering involves large, heavy equipment, it is also necessary that temperatures be maintained in the sheeting through the use of large, expensive ovens. After the sheeting has been oriented both longitudinally and transversely, it is then rolled and stored for subsequent use.

The forming of OPS sheeting is usually carried out on non-rotating thermoforming equipment with special provisions for the OPS material. It is necessary that the reheating of the sheeting as it is fed into the forming equipment be maintained uniformly throughout its width and lengths. As the material reaches a satisfactory forming temperature, the stresses which have been imposed during the biaxial orientation must be maintained by adequate clamping devices in order to preclude the sheet from shrinking back to its original dimensions and losing the orientation therein.

Since most non-rotary forming equipment is necessarily intermittent in its operation, the intermittent feeding of oriented sheet in such conventional forming equipment imposes inherent difficulties in the creation and maintenance of uniform temperature conditions throughout the forming area of the sheet.

There are several other approaches which have been used to some extent in the production of biaxially oriented sheeting. One of these, the bubble process, is typically the way much thermoplastic film is produced. By proper control of temperature and stretching, it is possible to produce a biaxially oriented film or sheet using this bubble technique. However, in practice it is proven to be very critical because of temperature uniformity requirements. Also this technique is not usable when it comes to thicker material such as that used in thermoformed articles or products on the order of meat trays, containers and tableware.

Further, there is some equipment in use which simultaneously stretches transversely and longitudinally. This equipment obviates the use of longitudinal stretching rolls such as those previously described, but it has certain disadvantages, namely, the amount of selvage which must be discarded due to the increased scalloped effect resulting from clamps which are necessarily moved further apart in the longitudinal direction in order to achieve such a simultaneous biaxial stretching action.

The molecular orientation of thermoplastic materials, as previously indicated, results in significant improvements in many of the characteristics of certain of these materials. Biaxial orientation is essential in most packaging and disposable products. If orientation is only in one direction, even though properties may be substantially improved in that direction, they are reduced in the other dimensions. Typical of products which are oriented in one direction only are monofilaments and fibers. During orientation, the molecules in the material are shifted from random coil entanglement to a relative alignment parallel to principal axes of stretch. This results in significant improvements in physical properties, optical properties and in improved barrier properties and stress crack resistance.

For example, among the physical property improvements, the impact strength in materials such as OPS are improved on the order of ten times with two to three times the tensile strength of non-oriented polystyrene and as much as three times the improvement in yield elongation.

There is a definite need in the art to combine the advantages of continuous extrusion and orientation with intermittent forming systems due to the wide availability of such intermittent systems and the capital investments which they represent. Furthermore, such intermittent systems are familiar and basically reliable equipments which have a market acceptance and good will that keep them in demand.

Accordingly, the need is established to interface the continuous extruding and orienting systems for thermoplastics such as OPS with intermittent formers while meticulously preserving the integrity of dimension and orientation of the continuously produced thermoplastic material.

The thermal stability of the oriented thermoplastic material is also critical if the heat of extrusion and orientation is to be preserved in the continuously produced web of thermoplastic to a sufficient degree to permit intermittent forming and cooling in the intermittent forming apparatus.

It is therefore an object of the present invention to provide a new and novel method and apparatus for forming thermoplastic products by continuous extrusion, orientation and intermittent forming in rapid succession in an integrated in-line system.

Yet another object of the present invention is to provide a new and novel thermoplastic product forming method and apparatus which extrudes, biaxially orients and forms thermoplastic products and minimizes, to an optimum degree, the time lag between the extrusion, orientation and forming stages thereof.

Yet another object of the present invention is to provide an integrated method and apparatus for forming biaxially oriented thermoplastic products in a continuous extrusion, orientation and forming process which achieves higher basic linear speeds than has heretofore been accomplished while interfacing intermittent forming means with continuous extrusion and orientation means to preserve the dimensional, orientational and thermal state of the material through the interface.

Yet another object of the present invention is to provide a method and apparatus for thermoforming biaxially oriented thermoplastic products of enhanced quality.

These and other objects of the present invention will become more fully apparent with reference to the following specification and drawings which relate to several preferred embodiments of the present invention.

SUMMARY OF THE INVENTION

The process of the present invention commences with the continuous extrusion of a relatively narrow strip of thermoplastic material from a die at a relatively high linear speed and which is extruded at the preferred orientation temperature. If the extrusion temperature is above the desired orientation temperature then it may be passed over cooling rolls in order to bring it down to the desired orientation temperature. The strip is then passed through differential speed rolls, if desired, to impart a predetermined maximum or partial amount of longitudinal or machine direction stretch orientation thereto and immediately subsequent to this orientation is passed into a transverse stretching station which consists basically of a pair of divergently disposed rotating saw blade like devices which engage the strip along each edge and divide it into a series of increments which are then continuously separated transversely to a distance of approximately three times the original dimension of the extruded strip.

Since the longitudinal direction is also desirably oriented by stretching on an order of magnitude of three times the original dimension, if this has not been achieved by the stretching rolls upstream from the transverse stretching mechanism, the balance of the longitudinal stretching may be taken care of downstream from the transverse stretching apparatus. All of the foregoing steps, however, are performed on a continuous and uninterrupted basis.

After the proper degree of orientation has been biaxially imparted to the extruded and now lengthened and widened strip of material, the material is continuously transferred onto the peripheral surface of a rotating and undulating dynamic storage drum which includes retention devices to hold the stretched sheet to its new dimensions at the point of transfer and over its entire juxtaposition with the said peripheral surface.

Downstream from the rotating and undulating dynamic storage device is an intermittent feed means timed with the undulations of the storage device to ingest a given incremental length of oriented web and dispose it within an intermittent forming mold. Means are provided to maintain the dimensional and orientational integrity and preserve the temperature in the web from the outlet of the orientation device into the intermittent former such that the heat of extrusion and orientation is preserved sufficiently to permit thermoforming.

In order to enhance the operation and the quality control, the biaxial orientation equipment must be physically engaged, in some part, at its output point with the rotating and undulating peripheral surface of the dynamic storage means and therefore, problems of inertial interaction between these two devices have been noted. The present invention includes new and novel means for precluding the full inertial effect from taking place and includes a structure which in fact minimizes, to an optimum degree, the equipment inertia present at the orientation-storage-forming equipment interface to thereby preclude uneven longitudinal stresses from being imparted to the material because of this inertial problem at the interface.

DETAILED DESCRIPTION OF THE DRAWINGS

Figure 1A:
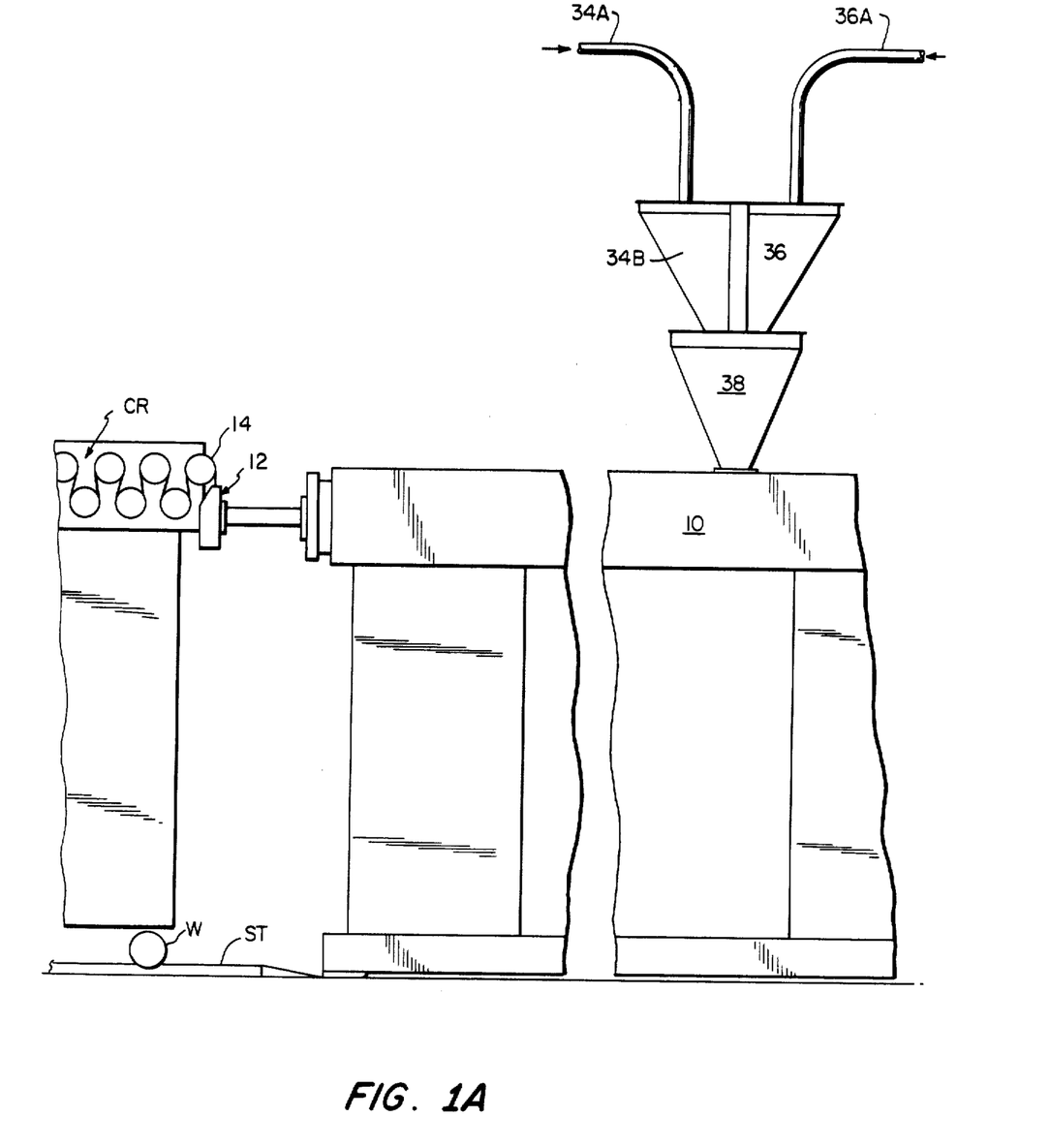
FIGS. 1A, 1B and 1C comprise a schematic of an in-line continuous extrusion, biaxial orientation and intermittent forming system of the present invention with FIG. 1B illustrating positions (A), (B) and (C) of a dynamic storage device of the present invention.
Figures 1A, 1B:
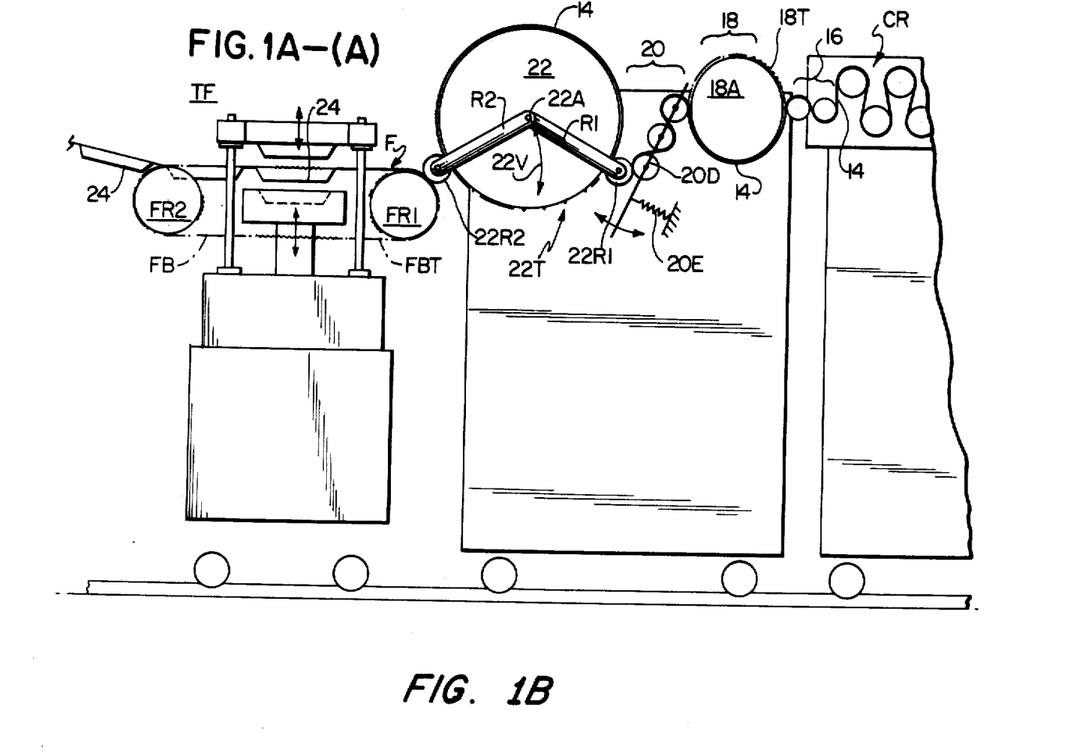
Figure 1B:
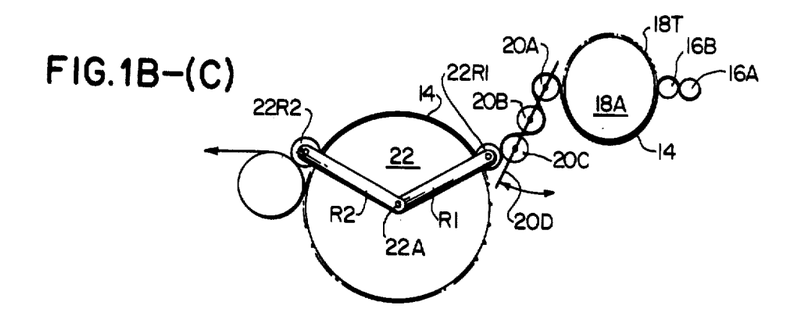
Figure 1C:
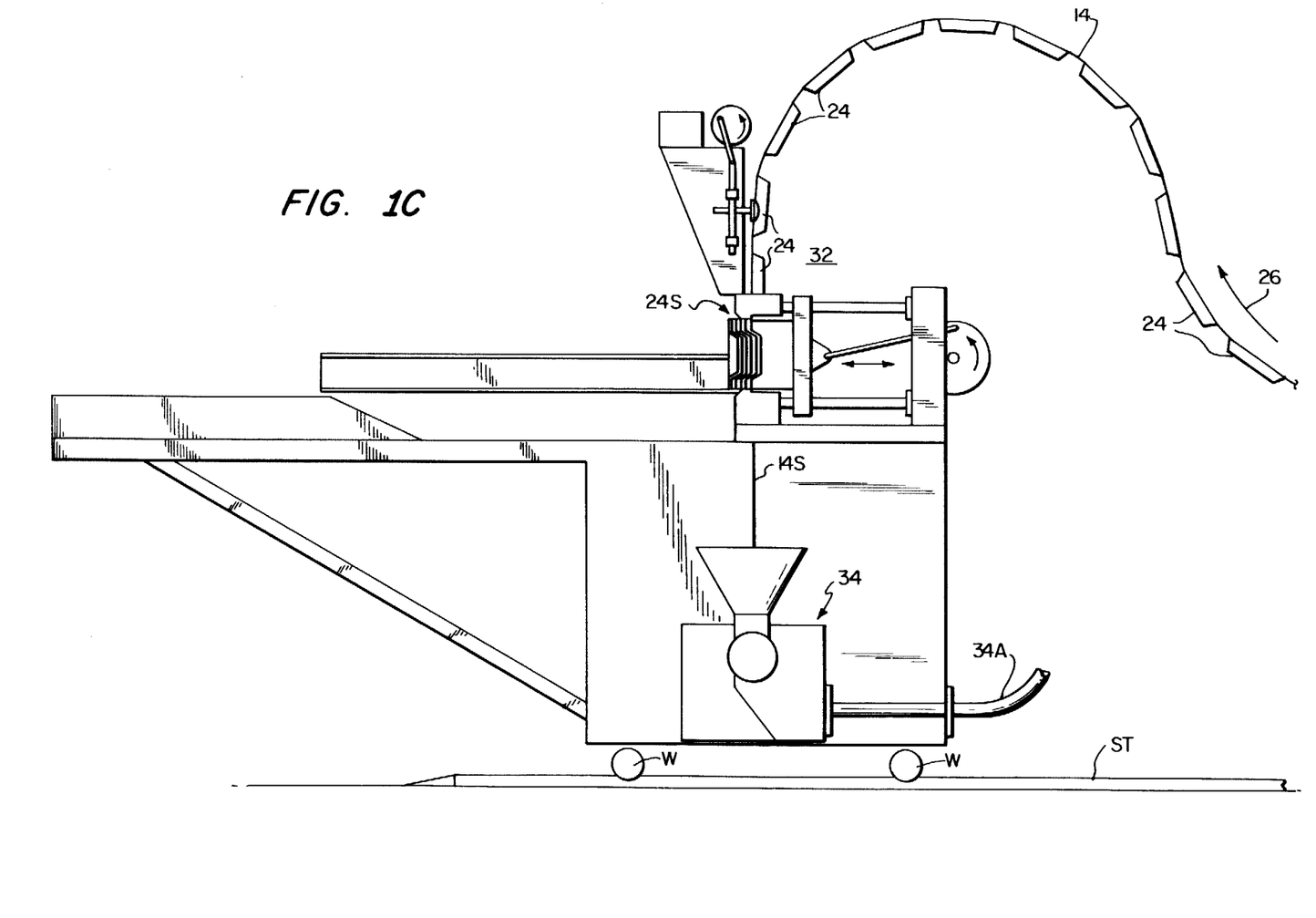

Referring in detail to the drawings and with particular reference to FIGS. 1A, 1B and 1C, an extruder 10 is illustrated as having an output to a die 12 which forms a narrow web 14 of polystyrene or other thermoplastic extrudate. The extrudate 14 is feed into a bank of cooling rolls CR.

As illustrated, the extruder 10 and the die 12 feed an extrudate web 14 into a bank of cooling rolls CR which are provided, as is well-known in the art, with a suitable heat exchange medium and control therefor, or which simply provide the proper reach of web material 14 for a given temperature of extrusion to permit it to cool sufficiently in the ambient conditions of the process equipment such that when it reaches an input roll assembly 16 it is at the proper temperature for orientation.

The input roller assembly 16 is illustrated as including a first roller 16A and a second roller 16B which receives the web 14 in a serpentine path therebetween and which rolls 16A and 16B are driven at differential rotational velocities to impart a longitudinal or machine direction orientation or stretch to the web 14 prior to the engagement of the said web 14 with the teeth 18T of a transverse stretcher blade assembly 18.

Figure 7:
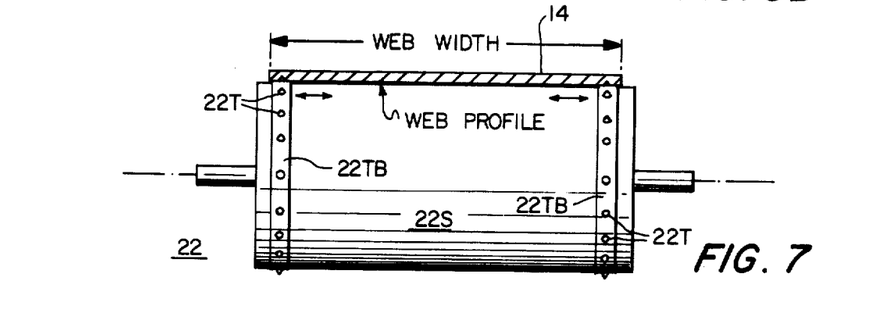
FIG. 7 is a top plan schematic of a preferred dynamic storage or accumulator drum of the present invention.

Similarly to the input roller assembly 16, an output roll assembly 20 is shown as comprising first, second and third output rolls 20A, 20B and 20C extending downstream, in that order, from the transverse blade assembly 18 and which further includes the concept of driving these rollers at selectively differential rotational velocities to impart further longitudinal stretch, if desired, to the web 14 downstream of and subsequent to the impartation of transverse orientation thereto. The downstream output roller 20C is engaged with the periphery of an input roller 22R1 juxtaposed with the periphery of a dynamic storage or accumulator drum 22 such that in its rotation about the center 22A, the oriented web material 14 will be substantially immediately placed upon the periphery of the storage drum 22, the latter being provided with suitable gripping means such as serrations, vacuum orifices or the like, schematically shown as upstanding teeth 22T for piercing or otherwise securely engaging the web to hold it against a relaxation of the imparted orientation therein during the molding process on the periphery of the mold wheel 22. As shown in FIG. 7, bands 22TB of such teeth 22T are mounted on opposite ends of the drum 22 and are adjustable in and out for accommodating different web widths.

The output roller set 20 is comprised of at least three rollers 20A, 20B and 20C which are mounted on a common frame 20D which is biased by suitable means 20E toward the storage drum 22 and its associated input roller 22R1, to be hereinafter more fully described. The biasing means 20E thus assumes that the downstream interforming roller 20C is in constant juxtaposition with the input roller 22R1 such that it faithfully follows all rotations and undulations of the surface of the storage input roller 22R1 which, in turn, follows the undulating and rotating peripheral surface of the storage drum 22.

The biasing means 20E can be any suitable device such as a compression spring or a pneumatic spring or cylinder.

The common support 20D for the downstream output roller set 20 is pivoted on the center line of the upstream roller 20A of that set and the transverse stretching saw blades 18 and the input stretch rolls 16 are independently mounted with respect to the said output roller set 20.

Thus, only the inertia of the three output stretching and interface rollers 20A-20C and the rollers frame 20D on which these are mounted is involved in the interfacing of the biaxially oriented web 14 and the undulating peripheral surface of the rotating storage drum 22. Through the use of three or a greater odd number of rollers, disproportionate elongation due to oscillation is algebraically avoided and a more uniformaly elongated web 14 will result than would result with the use of two or a greater even number of rollers. The gap between the three rollers 20A-20C is kept very small to avoid shrinkback of the now biaxially oriented web traversing these rolls. Because the inertia of this particular output stretch and interface roll means has been minimized, the mass and inertia of the remaining portions of the biaxial orientation equipment is not critical to the quality of the oriented thermoplastic material 14.

Figure 6:
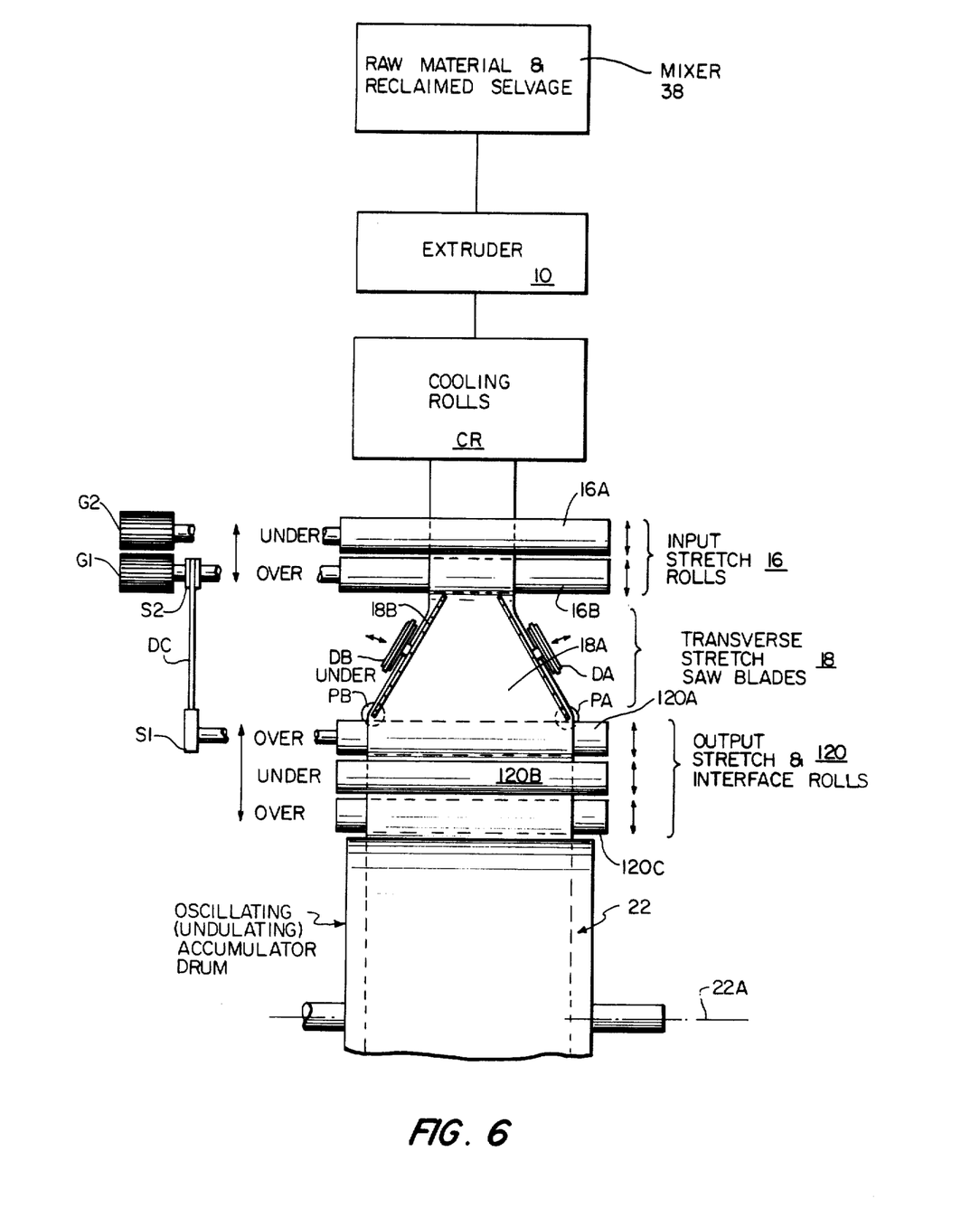
FIG. 6 is a top plan partial schematic of the embodiments of FIGS. 2 and 3.

The drive means DA and DB on the transverse stretch saw blades 18A and 18B, respectively, and the nearest rollers thereto, namely, the upstream interface roller 16B and the downstream initial roller 20A are all driven preferably from a common drive motor through various drive belts or chains and the rollers 16B and 20A are illustrated in FIG. 6 as being driven by a common drive belt DC which engages drive pulleys or sprockets S1 and S2 mounted on the shafts of the rollers 20A and 16B, respectively.

Further, the roller 16B includes a passive output gearing G1 which is engaged with compatible gearing (of a predetermined ratio) G2 mounted on the shaft of the initial input roller 16A such that the differential speed between the rollers 16A and 16B can be effectuated from the same common drive means DC that drives both the rollers 16B and 20A.

Thus, the ratio of the gears G1 and G2 can be changed to vary the amount of longitudinal stretch achieved between the initial input rollers 16A and 16B.

The last two rolls 20B and 20C on the downstream side of the transverse stretcher blades 18 are not driven from the stretcher apparatus. The last output or interface roll 20C is driven by the surface speed of the input roller 22R1 and this is driven in turn by the surface of the storage drum 22 with which it is in contact and this speed is established and selected to provide the proper longitudinal orientation when measured against the fixed speed of the initial output roll 20A. The middle roll 20B of the output roller group 20 merely idles and reaches a speed in between that of the other two rolls 20A and 20C of the set 20.

In order to maintain a constant dimensional relationship between the transverse stretch saw blades 18A and 18B and the initial output roller 20A, the blades 18A and 18B are pivoted at their downstream edge on the pivots PA and PB, respectively, rather than at the center of the said blades 18A and 18B. Therefore, the relationship between these blades 18A and 18B and the output roller 20A remains constant during adjustment of the blades between a direction parallel to the machine direction oriented at 45° with respect to the machine direction.

The second roller 16B and its companion input roll 16A in the input stretch roll set 16 move in and out to adjust to the position of the transverse stretch saw blades 18A and 18B depending upon the adjusted position of the latter. Suitable stop means or bosses are provided on the saw blade adjustment brackets to interact with the mounting of the various input rollers 16A and 16B to preclude engagement of the rolls with the saw blade but maintaining the desired immediate proximity thereof.

The material tension of the web 14 proceeding beneath the roller 16A back over the roller 16B and thence beneath the saw blades 18A and 18B is sufficient, since the web 14 initially approaches the roll 16A from above, to cause the roll 16A to track the movements of the roll 16B and thereby maintain the desired minimum spacing by way of the material tension in the web 14.

Suitable means are also provided within the mounting bracket 20D of the output roll set 20 to provide for moving the three rollers 20A, 20B and 20C apart and back together again to provide for the threading of material therethrough at the beginning of an extrusion and orientation and molding cycle and then placing the rollers under a sufficient bias to provide a predetermined minimum spacing and pressure thereon such as by small air cylinders or the like, all of which is within the purview of one of ordinary skill in the art.

The dynamic storage or accumulator drum 22 is positioned between the output roll set 20 of the biaxial orienting stages 16-18-20 and the input roll or sprocket FR1 of an incremental feeder F having endless feed belts FB disposed about input rollers or sprockets FR1 and output rollers or sprockets FR2 such that opposite selvage edges of the web 14 will be gripped by the feed belts FB and the web 14, with its dimensional integrity preserved, will be indexed through a reciprocating or intermittent thermoformer TF.

The feed belts FB may be equipped with rows of upstanding teeth FBT such that these teeth pierce the selvage edges of the web 14 to preserve its dimensional integrity and hence, its orientation.

The dynamic storage or accumulator drum 22 is driven in a vertical arc 22V about its central axis of rotation 22A. Radius arm assemblies R1 and R2 mounting, respectively, the input and output rollers 22R1 and 22R2 on their outboard ends, constrain these rollers to closely follow the peripheral surface of the storage drum 22 to lengthen the arc of contact subtended by the juxtaposed web 14 thereon.

For example, the lowermost position (C) of the storage drum 22 is the shortest arc and shortest accumulation of the web 14 on the drum 22. This length of accumulated web 14, increases through the intermediate position (B) of the drum 22 to a maximum length at position (A).

By way of correlation to the intermittent former TF and the intermittent feed means F, the feed belts FB and feed sprockets FR1 and FR2 are fixed and the former TF has just completed its cycle at position (A) of the storage drum 22.

In the transition of the storage drum 22 from position (C) a position (A) the former TF has cycled to thermoform and cool the web to define products 24 therein while the feed belts FB are still.

In the transition from position (A) to (C), through (B) the maximum stored length of web 14 on the surface of the storage drum 22 is reduced by the exact increment plus selvage needed to load the thermoformer TF for one cycle thereof. Thus, it is during this period that the Thermoformer TF is being opened to receive the incremental length of web 14 by commensurate indexing of the feed belts Fb and sprockets FR1 and FR2 in the intermittent feed means F.

The (A), (B), (C), (A) - - - cycle repeats itself and the output roll set 20 permits the oriented web 14 to be continuously replenished to the maximum accumulated length on the rotating and undulating peripheral surface of the storage drum 22 while minimizing inertial stresses therein due to the odd number of rollers therein which cancels any cumulative lengthening of the web 14 due to the undulations of the storage drum 22 and downstream roller 20C in the output roll set 20.

Figure 5A:
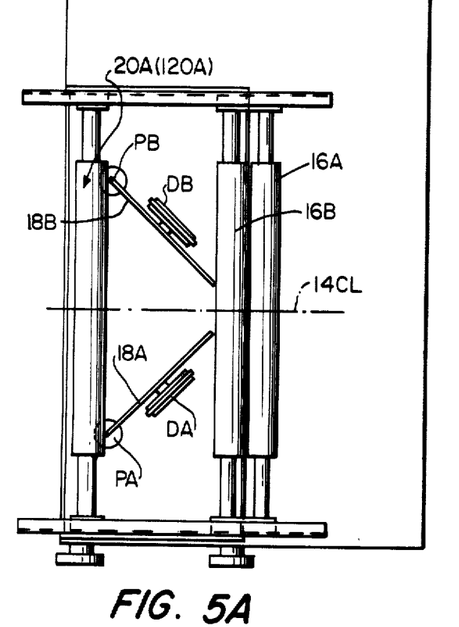
FIG. 5A is a top plan schematic illustrating the transverse stretching blades of the present invention set at maximum divergence.
Figure 5B:
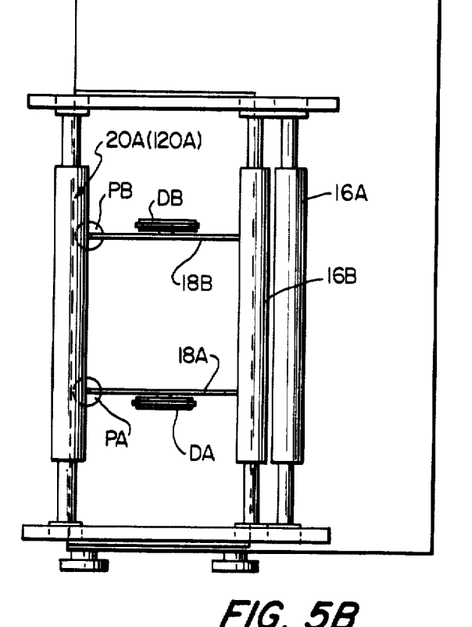
FIG. 5B is a top plan schematic illustrating the transverse stretching blades of the present invention set at minimum divergence (mutually parallel)

The transverse stretcher blade assembly 18 is best illustrated by joint reference to FIGS. 1B, 5A and 5B in which the transverse stretcher blade assembly 18 is illustrated as including first and second circular saw blades 18A and 18B, respectively, which are mounted on downstream pivots PA and PB, respectively, which in turn, are suitably mounted by any well-known means on a machine frame such that the saw blades 18A and 18B are adjustable about the pivot means PA and PB between a maximum divergence of 45° to the machine direction or product center line illustrated in FIGS. 5A and 5B as product center line 14CL and which are driven about central blade axes by means of drive pulleys DA and DB which are also positioned for movement with the blades 18A and 18B about the said respective pivot means PA and PB.

The teeth 18T about the periphery of each blade engage the outermost edges of the web 14 and cause it to change from its initial extruded dimension at the input side of the blades to a much wider dimension commensurate with the divergence at which the blades are set at the output side thereof. In this manner, a transverse orientation is imparted to the web 14 in a continuous manner as it traverses the transverse orientation blade assembly 18 from the input roll assembly 16 to the output roll assembly 20.

Figure 2:
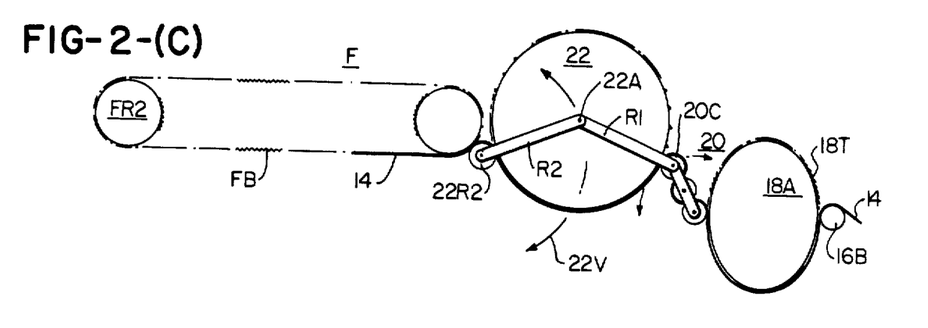
FIG. 2 is another embodiment of the storage or accumulator system and former of FIG. 1B in operating position (A), (B) and (C) with the feed to the former being inverted from that in FIG. 1B.
Figure 4A:
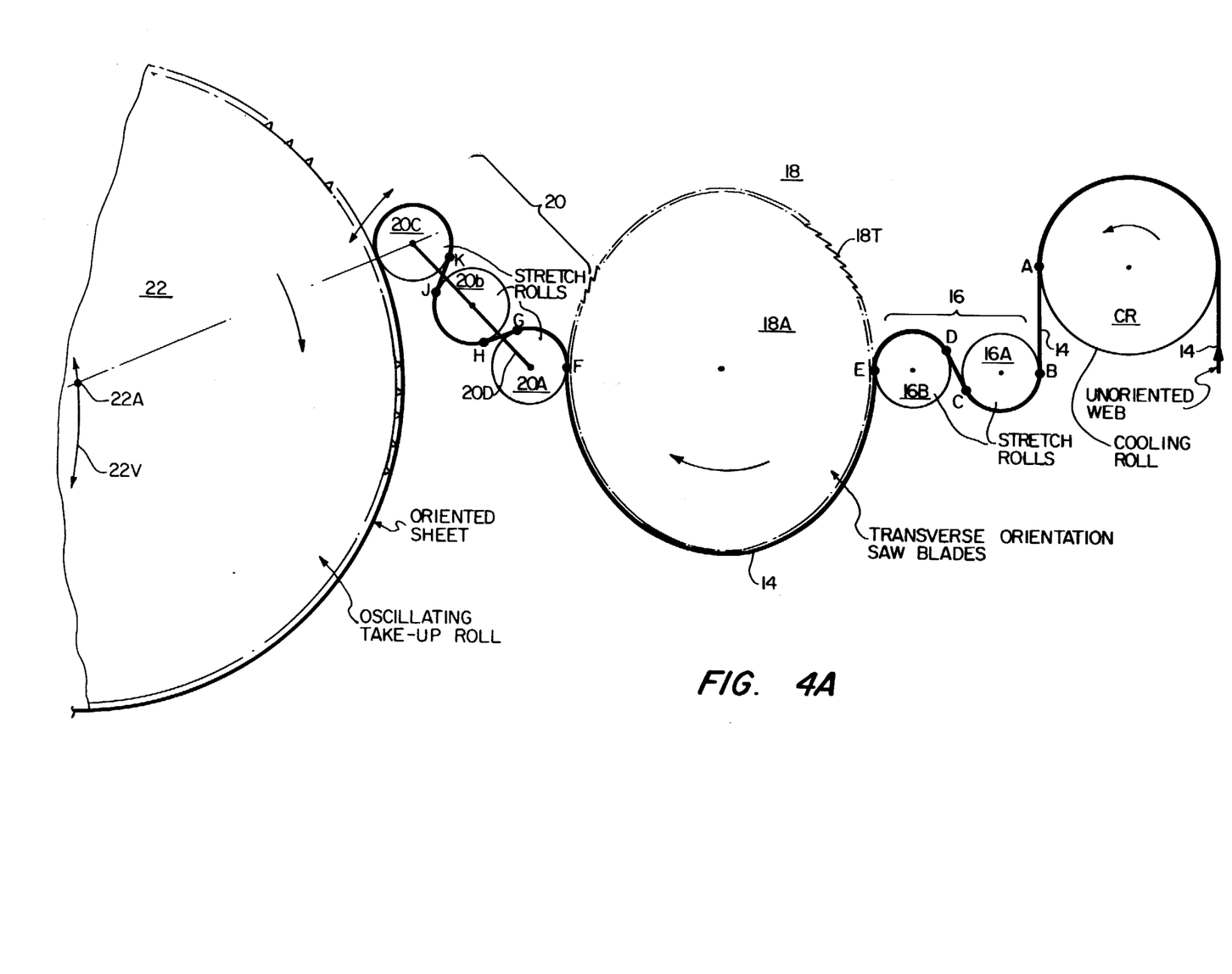
FIGS. 4A and 4B are correlated schematic apparatus and the biaxial orientation of the extrudate which is possible with the present invention in correlation with the relative position of the extrudate in FIG. 4B in the orientation apparatus of FIG. 4A.
Figure 4B:
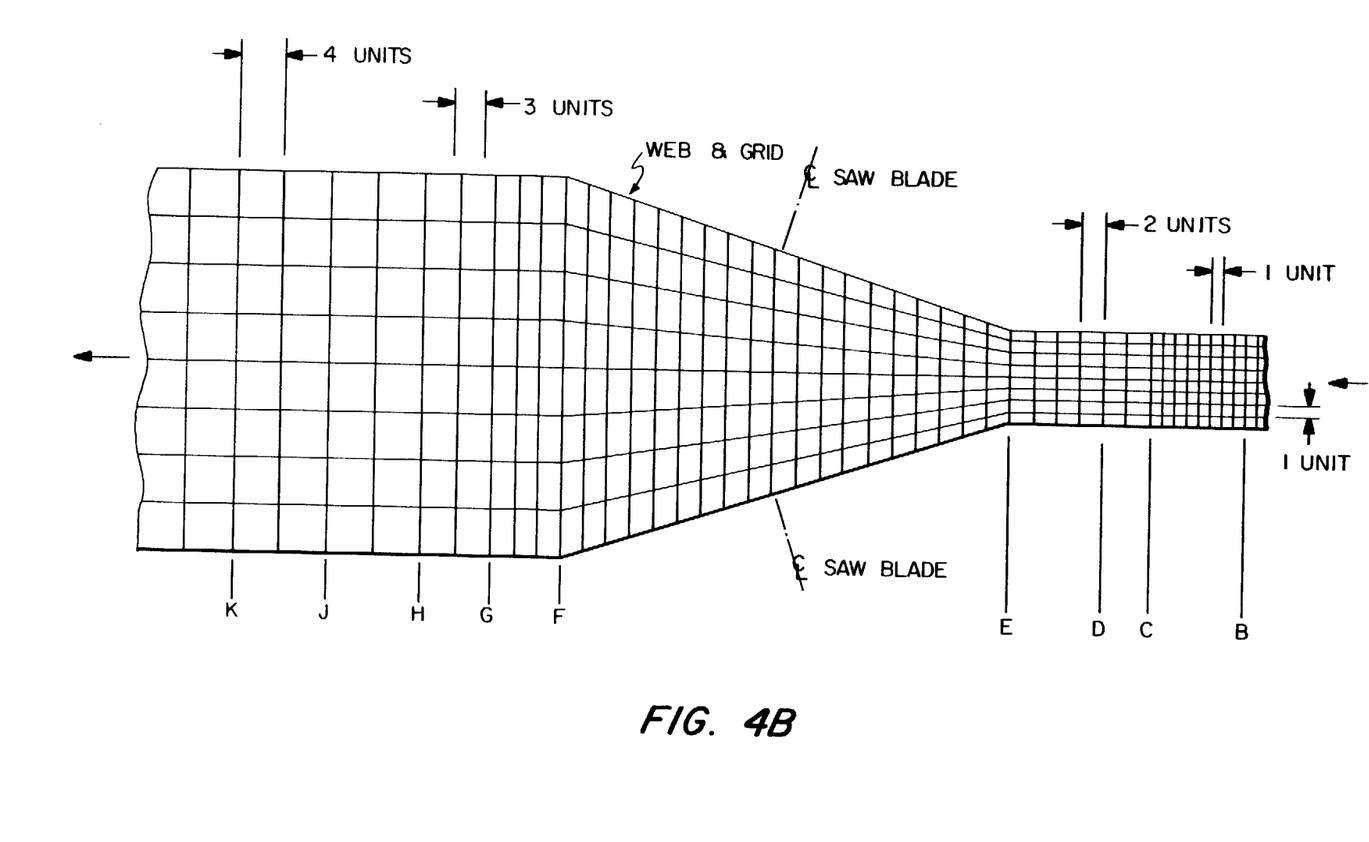

In order to fully explain at this point in time the orientation process in the biaxial mode, reference is now made to FIGS. 4A and 4B, with FIG. 4A being an enlarged partial schematic of the biaxial orientation and interfacing portions of FIG. 2.

In practice, the longitudinal stretching or machine direction stretching or orientation can be carried out immediately before or immediately after the transverse stretching or half before and half after the said transverse stretching. Furthermore, any other ratio of initial machine direction stretch and final machine direction stretch is also feasible. The degree of transverse or longitudinal orientation can be varied to suit a particular product which may have depth or shape requiring less initial orientation of the sheeting in one or another direction. Therefore, the present invention provides a system which is very facile and variable with regard to unique and unusual molded shapes.

In the present invention, the amount of selvage which falls outside of the transverse stretcher blades 18A and 18B is the same as the amount of selvage which falls outside of the holding devices 22T about the periphery of the dynamic storage or accumulator drum 22. These holding devices 22T, as illustrated, for example, in FIG. 6, are along both peripheral edges of the storage drum 22 which is shown in top plan view in FIG. 6 and in FIG. 7.

Referring next to FIG. 4B, it can be seen that in the initial upstream zone BC, that no biaxial orientation is imparted to the web 14, that in the zone DC partial machine direction stretch of twice that existing in zone BC is imparted to the web 14 and in downstream zones GH and JK additional longitudinal or machine direction stretch is imparted to the web 14 to twice again that amount of stretch achieved in zone CD.

Full transverse stretch in an amount equal to four times that of the dimensions in zone BC is achieved in the zone EF defined by the saw blades 18.

A wide variety of longitudinal and transverse stretch modes can be effectuated with the present invention. In all cases, of course, the transverse stretching is achieved within the zone EF and not within the upstream and downstream zones BE and FK, respectively.

Referring further to FIG. 4A, the diameter of the rolls 16A, 16B, 20A, 20B and 20C are kept as small as is consistent with minimizing the deflection of these rolls under load. This lends lateral stiffness to the web 14 and reduces shrinkback and attendant loss of orientation. Also, the distance between the rolls in the respective roll sets 16 and 20 is preferably no greater than to allow for slight clearance of the web or extrudate 14 which further minimizes the shrinkback which otherwise occurs as the material is transferred from one roll to another between the tangent points such as CD, GH and JK.

The surface speed of the second roll 16B is usually faster than the surface speed of the first roll 16A so as to achieve longitudinal stretch in the upstream zone CD and as shown, the said surface speed of the roller 16B is twice that of the roller 16A. Thus 50% of the longitudinal or machine direction orientation occurs in the transfer of material between the tangent points C and D on the rollers 16A and 16B, respectively.

Also, as shown in FIG. 4A, the teeth 18T on the transverse stretcher blade 18A are very close to the surface of the second roller 16B ad the perimeter speed of the blades is preferably slightly faster but substantially equal to the surface speed of the roller 16B thereby making the transfer of material from one to the other more effective. The teeth 18T actually penetrate the edge of the web or strip 14 so as to hold the material securely as transverse stretching takes place due to the angular orientation of the blades 18A and 18B, the latter being best shown with reference to FIGS. 5A and 5B.

The third or initial output roller 20A is also positioned very close to the teeth 18T of the blades 18A and 18B so as to minimize shrinkback at this particular transfer point comprised by the interface between the said roll 20A and the blades 18A and 18B. The surface speed of the roller 20A is usually and preferably slightly faster but substantially equal to the perimeter speed of the transverse stretching blades 18A and 18B, the fourth roller 20B is maintained close to the third roller 20A, and the fifth roller 20C close to the fourth roller 20B, in order to minimize shrinkback during the transfer from one roller to another. Usually, the fifth roller 20C is run twice the peripheral speed of the third roller 20A with the preferred speed being such as to accomplish the remaining 50% of the longitudinal or machine direction orientation in the web 14 as illustrated. The web 14, as it leaves the fifth or interfacing roller 20C onto the mold wheel 22 is thus fully biaxially oriented.

The fourth roller 20B is rotated by the web 14 at a peripheral speed midway of those of the third and fifth rollers 20A and 20B such that two longitudinal stretches occur, namely, one at the tangent points GH and the other at the points JK.

All of the longitudinal stretching rollers 16A, 16B, 20A and 20B and the storage drum 22 are preferably coated with flurocarbon such as Teflon to avoid sticking of the web 14 thereto. Also, such rollers and drums are usually made with thin-walled steel tubes in order to minimize the heat retention capacity and heat transfer to the ends of the rollers. Therefore, in the area of contact with the web 14, the rolls reach about the same temperature as that of the web itself and thus maintain thermal stability and uniformity in the web 14. Heat may also be applied to the rolls and drum by any suitable means known in the art.

Reference is now made to FIG. 1C in which the molded products 24 traveling in the direction 26 are delivered to a reciprocating cutter means 32 which severs the molded products 24 from the selvage of the web 14 and causes the said severed products 24 to be stacked in a suitable product stack 24S which is schematically shown.

While the severed products travel to a stack 24S, the selvage 14S travels to a selvage grinding and recycling means 34 which blows the ground selvage through a conveyor tube 34A to a recycling hopper 34B adjacent a hopper 36 fed from a tube 36A from a source of new plastic granules or pellets to place both reground selvage and the pellets into a mixer assembly 38 of the type well-known in the art to redirect both fresh raw material and recycled selvage into the extruder 10.

Referring now to FIG. 2 of the drawings, the schematic illustration of FIG. 4A is shown as embodied in a system for feeding an intermittent former and receiving incoming web 14 from a continuous cooling roll assembly CR, the latter being fed by a continuous extruder (not shown) except in FIG. 1A.

The web 14 proceeds beneath the storage or accumulator drum 22 in the embodiment of FIG. 2 and the intermittent feed mechanism F and its feed belts FB are mounted above the output roller 22R2 of the dynamic storage drum 22 rather than beneath it as in the embodiment of FIG. 1B. By the same token, the web 14 proceeds beneath the sprockets FR1 and FR2 of the intermittent feed means F and is carried through this position into the thermoformer TF by the teeth FBT on the feed belts FB.

Like numerals designate like components between FIGS. 1A, 1B and 2 with one exception being that the positions of the feed belts FB and the sprockets FR1 and FR2 thereof with respect to the output roller 22R2 are different. Also, the output or downstream roller 20C in the output roll set 20 is positioned above the upstream roller 20A of that set in the configuration of FIG. 2 as opposed to beneath it in the configuration of FIG. 1B.

FIG. 2 clearly illustrates that the dynamic storage drum 22 is pivoted to describe the arc 22V about the central axis of rotation of the output roller 22R2 with the radius of the arc 22V defined by the length of the radius arm R2 and further defining the locus of the center point or axis of rotation 22A of the storage drum 22.

Furthermore, in the embodiment of FIG. 2, the input roller 22R1 of FIG. 1B has been eliminated and the downstream roller 20C of the output set 20 is positioned on the outboard end of the radius arm R1 to thereby follow the undulating peripheral surface of the dynamic storage drum 22 directly rather than through engagement with the input roller 22R1 as in the previous embodiment.

Also, the common link or bracket means 20D is joined with the radius arm R1 at the axis of rotation of the downstream output roll 20C in the interfacing output roller set 20.

The position of the output roller 22R2 for the dynamic storage drum 22 with respect to the input sprocket FR1 of the intermittent feed mechanism or assembly F is fixed such that the dynamic storage drum 22 nutates or oscillates about the center of rotation of the output roller 22R2 to describe the arc 22V with its axis of rotation 22A.

The radius arm R1 is the same length as the radius arm R2 and therefore, the downstream roller 20C of the output roller set 20 from the biaxial orientation devices 16-18-20 is constrained to remain on the surface of the dynamic storage drum 22 regardless of the position assumed by the axis of rotation 22A in the arc of oscillation 22V of the said dynamic storage drum 22.

This geometry also requires that the upstream rollers 20A of the output roller set 20 in the biaxial orientation apparatus 16-18-20 remains in substantially fixed relationship with the transverse orientation blades 18A-18B in the orienting apparatus to preclude the occurrence of uneven longitudinal stresses in the oriented web 14 during the transfer through the output roller set 20 onto the rotating and undulating surface of the dynamic storage drum 22.

As previously described for FIGS. 1A, 1B and 1C, the positions (A), (B) and (C) are functionally interrelated to achieve incremental feed of sufficient incremental lengths of the web 14 to provide for each intermittent forming cycle of the thermoformer TF to provide the products 24 which are subsequently outputted from the said thermoformer TF by the feed device F and feed belts FB.

Also, as shown in FIG. 2 there is a guide track GT receiving the web 14 and formed products 24 to carry them in the return direction 26 to the previously described cutting press 32 illustrated in FIG. 1C.

The dimensional interrelationships just described for the common bracket 20D, radius arm R1 and radius arm R2 are substantially identical in FIG. 1B and FIG. 2 since the geometry involved is for achieving the same purpose. Also, the fixed position of the output roll 22R2 of the dynamic storage drum 22 with respect to the first sprocket FR1 of the intermittent feed device F is basically as described in all embodiments of the present invention.

The length of the output roll set 20 is correlated with the diameter and extreme positions of the dynamic storage drum 22 such that the downstream roller 20C is precluded from traveling overcenter on the drum 22 and jamming.

Figure 3A:
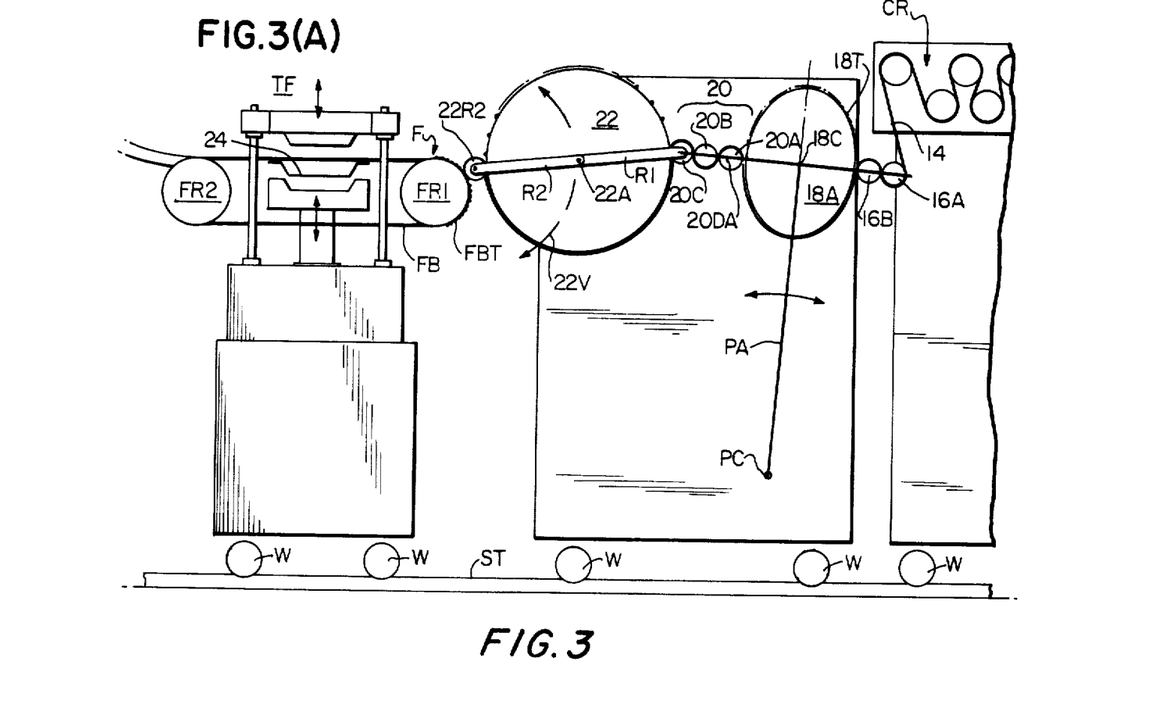
FIG. 3 is another embodiment of the apparatus of the system of FIGS. 1A and 2 illustrating the several positions (A), (B) and (C) of the accumulating or storage apparatus of those previous figures.
Figure 3B:
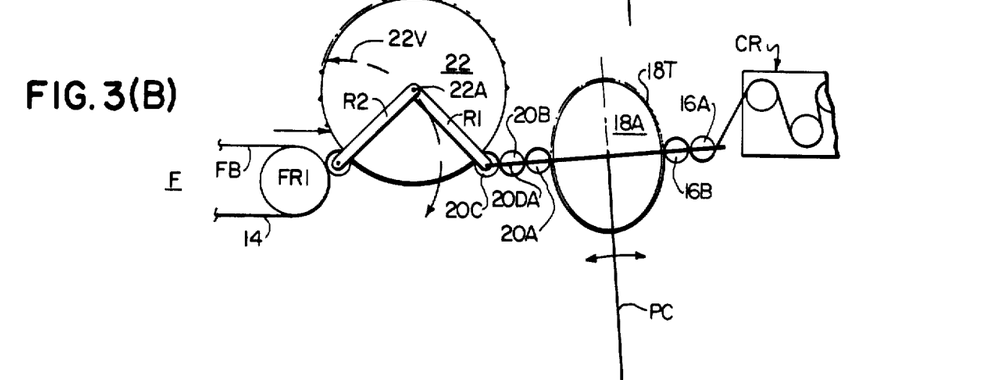
Figure 3C:
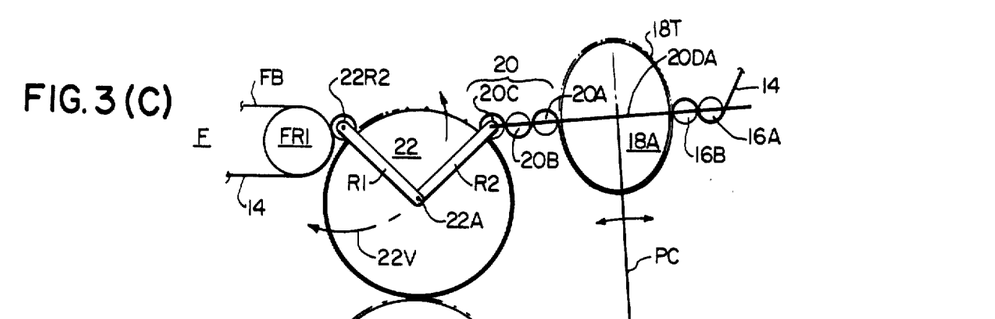

Referring now to FIG. 3, an alternate embodiment of the biaxial orientation assembly 16-18-20 having a downstream output roller 20C mounted directly on the radius arm R1 of the dynamic storage drum 22 will now be described.

As just stated, the configuration of the downstream output roller 20C is similar to that of FIG. 2. However, at this point, instead of the three output rollers 20A, 20B and 20C of the output roller set 20 being independently mounted with respect to the transverse stretcher blades 18A and 18B, the entire biaxial orientation assemblage of the input rolls 16A and 16B, the transverse stretcher blade 18A and 18B and the output rollers 20A, 20B and 20C are all mounted on a common rigid mount 20DA extending through the centers of rotation of the axes of each and every roller and transverse stretcher blade such that all of these elements move in unison.

Then, the entire orientation assemblage 16-18-20 is mounted on a common vertical arm PA having a pivotal center PC at the lowermost end thereof with the arm PA intersecting the common mounting means 20DA at the center of rotation 18C of the transverse stretcher blades 18A and 18B.

The output roller 22R2 of the dynamic storage drum 22 is in fixed position above the center of rotation of the first sprocket FR1 of the intermittent feed means F and is maintained in fixed position at that point throughout the positions (A), (B) and (C) of FIG. 3.

The operation of the radius arms R1 and R2 to cause the center of rotation 22A of the dynamic storage drum 22 to traverse the locus of the arcuate path 22V is the same as for FIGS. 1A and 1B with the exception that now the entire orientation assemblage pivots on the upstanding arm PA about the pivotal center PC rather than merely having the output roller set 20 compensate for the undulations of the rotating peripheral surface of the dynamic storage drum 22.

The embodiment of FIG. 3 tends to have more inertial stresses at the interfacing position between the downstream output roller 20C and the undulating rotating peripheral surface of the dynamic storage drum 22 than do the embodiments of FIGS. 1 and 2. However, the embodiment of FIG. 3 still provides a feasible approach to accomplish the objects of the present invention.

In all of the embodiments of FIGS. 1, 2 and 3, the various equipment modules such as the cooling roll apparatus, the orienting apparatus, the former and the cutting press and granulating apparatus for reclaiming the selvage are mounted on a guide track ST on a supporting floor or the like such that these various units can be placed together in a dimensionally desirable relative orientation to define the final in-line system of the present invention. Suitable rollers or wheels W on each of the various components are illustrated schematically as riding along the guide tracks ST.

Referring now to FIG. 7, a width of web 14 is shown in position on the rotating and undulating surface of the storage drum 22 with the surface being designated as 22S. At opposite ends of the surface 22S are rows of teeth or other web piercing elements 22T which are mounted on adjustable bands 22TB circumferentially disposed about the surface 22S immediately beneath the outermost selvage edges of the web 14 such that the bands 22TB can be moved inward and outward of the positions shown in FIG. 7 to accommodate webs of differing widths as they are ingested on and discharged from the undulating and rotating peripheral surface 22S of the dynamic storage drum 22.

Figure 8:
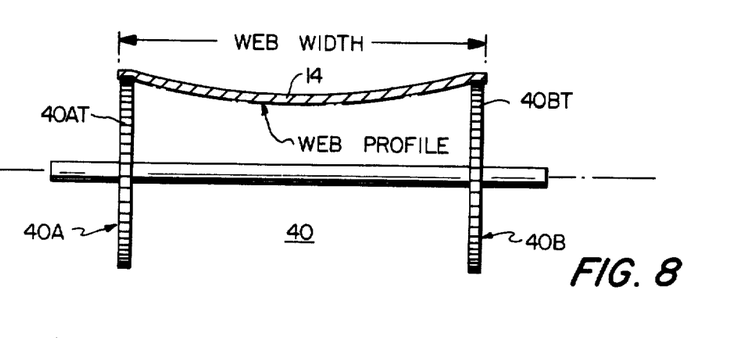
FIG. 8 is a top plan schematic of an alternate embodiment of dynamic storage device of the present invention.

An alternate embodiment of a dynamic storage device is shown in FIG. 8 as a pair of parallel saw blades or circumferentially toothed discs 40A and 40B having the toothed portions 40AT and 40BT thereof engaging the selvage edges of the web 14 received thereon. The web 14, as shown, when received on such a device as the double-toothed disc storage device 40 will sag markedly at its mid section as compared with the flat and undistorted position assumed by the web 14 on the dynamic storage drum 22 of FIG. 7. However, the embodiment of FIG. 8 represents a feasible alternative for achieving some of the objects of the present invention.

In any of the foregoing embodiments of the present invention, an important concept is always to positively restrict shrinkback of the oriented sheet by holding the dimensional integrity and the thermal stability of the sheet 14 to as close a tolerance as possible. The teeth 22T on the dynamic storage drum 22 or the tooth periphery 40AT and 40BT of the discs 40A and 40B of the dynamic storage device 40 basically achieve the dimensional stability.

The thermal integrity of the web 14 subsequent to its orientation is also of importance since the temperature of the oriented web 14 in the system of the present invention is preferably sufficient for the thermoforming operation to be performed by the downstream thermoformer TF. The temperature of the web 14 is controlled, as previously disclosed be roll or drum structure and/or auxiliary heating means of any suitable type known in the art.

The present invention further achieves an accumulation process which allows a constant speed extrusion and orientation operation upstream of the dynamic storage drum 22 and an intermittent feed from the downstream side of the dynamic storage drum 22 with both the continuous mode and the intermittent mode of the in-line system being effectively isolated one from the other by the interface provided by the dynamic storage drum 22 and its associated rotational and undulating action.

The dimensional integrity of the biaxially oriented and thermally maintained web 14 which exits from the dynamic storage drum 22 is maintained by the teeth FBT on the feed belts FB of the intermittent feed mechanism F such that a properly oriented and stabilized sheet of thermoplastic material 14 is incremented within the thermoformer TF at a proper temperature for thermoforming the products 24 therein. The cooling of the incremental section of web 14 fed to the thermoformer TF is accomplished by the thermoformer TF while the product 24 is in the mold and thus, when the web 14 bearing the product 24 and including the selvage scrap 14S leaves the thermoformer TF, the products 24 have been fixed in their oriented and formed condition.

In other words, the undulating and rotating dynamic storage drum with its web dimension maintaining teeth 22T thereon presents identical dynamic and thermal conditions to the biaxially oriented strip continuously on the upstream side of the drum and therefore, provides a biaxially oriented strip which is uniform in all respects when it is fed intermittently from the downstream side of the drum as required to synchronize with the reciprocating or intermittent forming equipment. The fact of full surface contact maintained throughout the reach of the biaxially oriented web 14 on the dynamic storage drum 22 aids materially in preserving the dimensional and thermal integrity of the biaxially oriented strip. Thus, the embodiment of FIG. 7 is the preferred embodiment since the embodiment of FIG. 8, while it provides the storage capability required to interface the continuous mode of the in-line process with the intermittent mode thereof is more difficult from the standpoint of maintaining thermal stability and also permits the web to sag which in some applications, could be undesirable from the internal stresses which result from such a sagging shape as shown in FIG. 8.

Therefore, it can be seen that the present invention provides a means for interfacing between a continuous extrusion and orienting mode and intermittent forming mode without either mode affecting the integrity of the other nor the quality and integrity of the biaxially oriented thermoplastic material in the system.

It should be understood that the METHOD AND APPARATUS FOR THE CONTINUOUS FORMATION OF BIAXIALLY ORIENTED THERMOPLASTIC MATERIALS AND FORMING ARTICLES THEREFROM BY INTERMITTENT FORMING MEANS INTERFACED THEREWITH of the present invention may be modified as would occur to one of ordinary skill in the art without departing from the spirit and scope of the present invention.

It is claimed:

1. The method of forming products of biaxially oriented thermoplastic material comprising:
   continuously extruding a web of thermoplastic material;
   biaxially stretching said web in a continuous manner to effect biaxial orientation therein and dimension said web for subsequent forming;
   substantially immediately transferring said web into conformal and dimensionally stable engagement with an undulating rotating peripheral surface to preclude loss of orientation;
   transferring said web from said undulating surface onto a downstream transfer means while maintaining the dimensional integrity of said web;
   synchronizing the transfer means with the undulations of said peripheral surface to intermittently advance lengths of the oriented web on said transfer means while continuously feeding the oriented web from said undulating surface; and
   forming products in said intermittently advanced lengths of said oriented web, wherein the stress placed in the thermoplastic material by said biaxial orientation is substantially maintained from the initiation of said orientation to the forming of the products therein.

2. The method of claim 1 which further includes:
   separating formed products from the selvage of said web; and
   recycling said selvage for extrusion back into a said web.

3. The method of claim 2, wherein said selvage is first granulated during said recycling.

4. The method of claim 1 which further includes:
   separating and accumulating said formed products from the selvage of said web;
   granulating said selvage; and
   recycling said granulated selvage for extrusion back into a said web.

5. The method of extruding and orienting a web of thermoplastic material in a continuous mode and subsequently forming molded products therefrom in an intermittent mode without interruption of said continuous mode, comprising:
   extruding a web of thermoplastic material and presenting it continuously to an orientation means at an optimum orientation temperature;
   stretch orienting the web to a desired degree in the transverse and longitudinal dimensions thereof whole said web is in continuous longitudinal motion;
   continuously interfacing and juxtaposing said oriented web with an undulating and rotating peripheral interfacing surface in a dimensionally stable engagement therewith to preserve the integrity of the orientation therein;
   intermittently extracting predetermined incremental lengths of the oriented web from the interfacing surface in synchronism with the undulations of the latter to establish an intermittent feed mode of said web downstream of said interfacing surface without disturbing the continuous mode upstream thereof;
   interfacing the said incremental lengths with a forming means; and
   intermittently forming products in said incremental lengths of oriented web with said forming means while preserving the integrity of orientation therein, wherein the stress placed in the thermoplastic material by said biaxial orientation is substantially maintained from the initiation of said orientation to the forming of the products therein.

6. The method of claim 5 which includes the further steps of:
   stripping said formed products and the resulting web selvage from said forming means.

7. The method of claim 6 which includes the further steps of:
   separating the formed products from the web selvage; and
   recycling the web selvage for further extrusion.

8. The method of claim 7 which further includes stacking the formed products separated from the web selvage.

9. The method of claim 5 which includes the further steps of:
   separating the formed products from the web selvage; and
   recycling the web selvage for further extrusion.

10. The method of claim 9 which further includes stacking the formed products separated from the web selvage.

11. The method of claims 5, 6, 7, 8, 9 or 10 wherein the thermoplastic material is polystyrene.

12. The method of claims 1, 2, 3, or 4 wherein the thermoplastic material is polystyrene.

13. The method of forming products of biaxially oriented thermoplastic material comprising:
   continuously extruding a web of thermoplastic material;
   biaxially stretching said web in a continuous manner to effect biaxial orientation therein and dimension said web for subsequent forming;
   substantially immediately transferring said web into conformal and dimensionally stable engagement with an undulating rotating peripheral surface to preclude loss of orientation;
   maintaining a stable temperature in said web on said undulating surface;
   transferring said web from said undulating surface onto a downstream transfer means while maintaining the dimensional integrity of said web;
   synchronizing the transfer means with the undulations of said peripheral surface to intermittently advance lengths of the web on said transfer means while continuously feeding the web onto said undulating surface; and
   forming products in said intermittently advanced lengths of said web on said transfer means substantially immediately upon the completion of each advance to enhance thermal stability therein, wherein the stress placed in the thermoplastic material by said biaxial orientation is substantially maintained from the initiation of said orientation to the forming of the products therein.

14. The method of claim 13 which further includes:

separating formed products from the selvage of said web; and recycling said selvage for extrusion back into a said web.

15. The method of claim 14, wherein said selvage is first granulated during said recycling.

16. The method of claim 13 which further includes:

separating and accumulating said formed products from the selvage of said web;

granulating said selvage; and recycling said granulated selvage for extrusion back into a said web.

17. The method of claims 13, 14, 15 or 16 in which the thermoplastic material is polystyrene.

18. The method of extruding and orienting a web of thermoplastic material in a continuous mode and subsequently forming molded products therefrom in an intermittent mode without interruption of said continuous mode, comprising:

extruding a web of thermoplasticmaterial and presenting it continuously to an orientation means at an optimum orientation temperature;

stretch orienting the web to a desired degree in the transverse and longitudinal dimensions thereof while said web is in continuous longitudinal motion;

continuously interfacing and juxtaposing said oriented web with an undulating and rotating peripheral interfacing surface in a dimensionally and thermally stable engagement therewith to preserve the integrity of the orientation and the temperature therein;

intermittently extracting predetermined incremental lengths of the oriented web from the interfacing surface in synchronism with the undulations of the latter to establish an intermittent feed mode of said web downstream of said interfacing surface without disturbing the continuous mode upstream thereof;

interfacing the said incremental lengths with a forming means; and intermittently forming products in said incremental lengths of oriented web with said forming means substantially immediately upon receipt thereof to enhance the thermal stability of said web while preserving the integrity of orientation therein, wherein the stress placed in the thermoplastic material by said biaxial orientation is substantially maintained from the initiation of said orientation to the forming of the products therein.

19. The method of claim 18 which includes the further steps of:

cooling the formed products and the web in the intermittent forming means;

stripping said formed products and the resulting web selvage from said forming means.

20. The method of claim 19 which includes the further steps of:

separating the formed products from the web selvage; and recycling the web selvage for further extrusion.

21. The method of claim 20 which further includes stacking the formed products separated from the web selvage.

22. The method of claim 18 which includes the further steps of:

cooling the formed products and the web in the intermittent forming means;

separating the formed products from the web selvage; and recycling the web selvage for further extrusion.

23. The method of claim 22 which further includes stacking the formed products separated from the web selvage.

24. The method of claims 18, 19, 20, 21, 22 or 23 wherein the thermoplastic material is polystyrene.

* * * * *